Jan. 12, 1971          A. KANTROWITZ ET AL          3,553,736
                        AUXILIARY VENTRICLE
Filed Nov. 25, 1968                                 2 Sheets-Sheet 1

INVENTORS
ADRIAN KANTROWITZ
STEINAR TJØNNELAND

BY Sheridan Neimark
ATTORNEY

INVENTORS
ADRIAN KANTROWITZ
STEINAR TJØNNELAND

BY *Sheridan Neimark*

ATTORNEY

United States Patent Office 3,553,736
Patented Jan. 12, 1971

3,553,736
AUXILIARY VENTRICLE
Adrian Kantrowitz and Steinar Tjønneland, Brooklyn, N.Y., assignors to the United States of America as represented by the Secretary of Health, Education, and Welfare
Filed Nov. 25, 1968, Ser. No. 778,447
Int. Cl. A61f 1/24
U.S. Cl. 3—1                     3 Claims

ABSTRACT OF THE DISCLOSURE

An artificial auxiliary ventricle is provided having a generally spherical shape and an internal configuration to direct or regulate the flow of blood. The unit is implanted in the ascending aorta during short-term inflow and outflow occlusion of the heart after which the circulation is reestablished and the anastomosis completed, or by direct and through side anastomosis without interrupting the circulation. The device is driven by compressed air from an outside tank via an air tube and is controlled by a solenoid valve which is triggered by the ECG or the left ventricular pressure curve.

---

The present invention relates to a heart pump, and more particularly to an improvement [1] in the Kantrowitz auxiliary ventricle.

In the normal mammal circulatory system, circulation is primarily effected by the left ventricle which, by its contraction or systole, forces blood into the aorta, any back flow of blood into the left ventricle being prevented by the closing of the aortic valve. The blood leaving the contracting ventrile during systole and forced into the aorta increases the pressure in the aorta and effects some stretching or inflation thereof. At the completion of the contraction and upon the closing of the aortic valve, the flow of blood through the circulary system continues, due to the exertion of pressure on the blood as the aorta shrinks to its normal diameter. As is well known, many cases of heart insufficiency occur because the heart muscle (myocardium) does not contract effectively, thus requiring excessive work from the heart to maintain normal circulation.

Artificial auxiliary ventricles have been previously devised and certain of these have been used with some success in overcoming the above difficulty. However, certain of these prior art devices have suffered from difficulties, e.g. occupying too much space in the left chest, thereby interfering with normal functioning of other organs, requiring excessive time for carrying out surgical implantation, lacking accessibility in the chest, and providing hemodynamic disadvantages in forcing the blood to flow along abnormal physiologic routes.

It is, therefore, an object of the present invention to reduce the workload of the heart and to improve and/or to restore normal circulation.

It is another object of the present invention to provide a new and improved auxiliary ventricle.

It is another object of the present invention to provide an intracorporeal, avalvular, controllable auxiliary ventricle or booster heart which is effective in offering assistance to the failing left heart.

It is another object of the present invention to provide an artificial device offering patients with myocardial insufficiency either prolonged or intermittent assistance.

It is another object of the present invention to provide an artificial heart pump occupying as little space as possible in the left chest and topographically situated very close to the heart for increased accessibility and to reduce interference with all other organs.

It is another object of the present invention to provide an artificial heart pump close enough to the natural heart for maximum assistance to the left ventricle and augmentation of coronary flow, yet providing minimal interference with normal physiology when turned off.

It is another object of the present invention to provide an improved auxiliary heart pump which is safe for intermittent operation and which minimizes thrombus formation.

It is another object of the present invention to provide an improved auxiliary heart pump which may be surgically implanted very quickly and yet which will occupy less space in the chest.

It is another object of the present invention to provide an auxiliary ventricle which has the surgical advantage of being placeable entirely in the ascending aorta, thereby being more accessible and permitting blood to flow along its normal physiologic route.

It is another object of the present invention to provide an artificial auxiliary ventricle which may be left in place permanently.

These and other objects and the nature and advantages of the present invention will be more apparent from the following detailed exemplary description, taken in conjunction with the accompanying drawings wherein.

Figure 1:
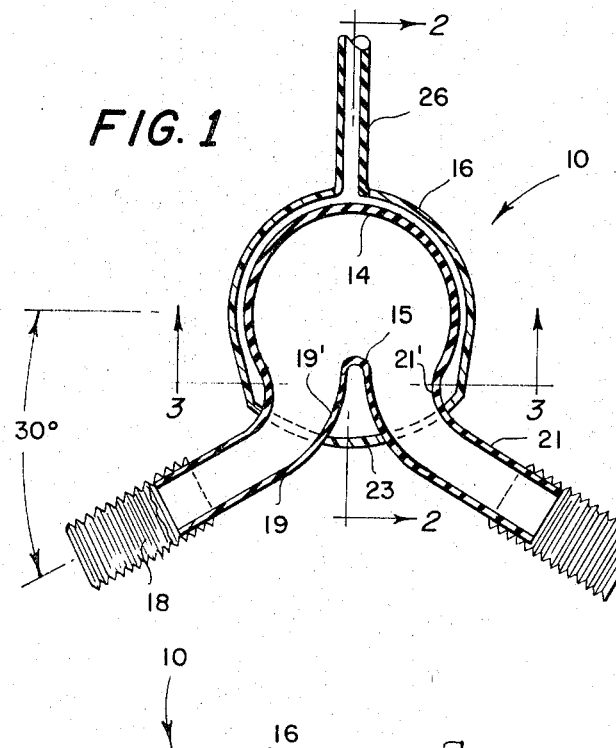
FIG. 1 is a section view of the improved auxiliary ventricle of the present invention.
Figure 2:
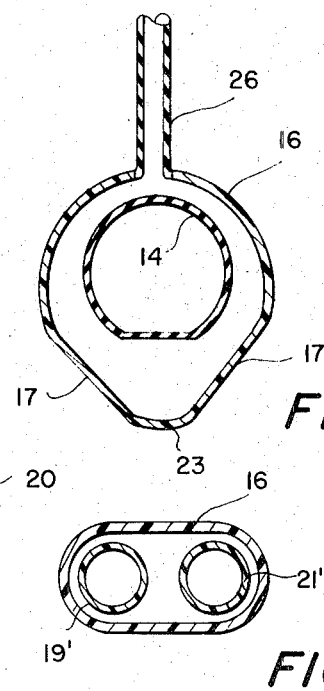
FIG. 2 is a sectional view taken along line 2—2 of FIG. 1.
Figure 3:
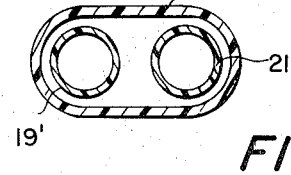
FIG. 3 is a sectional view taken along line 3—3 of FIG. 1.
Figure 4:
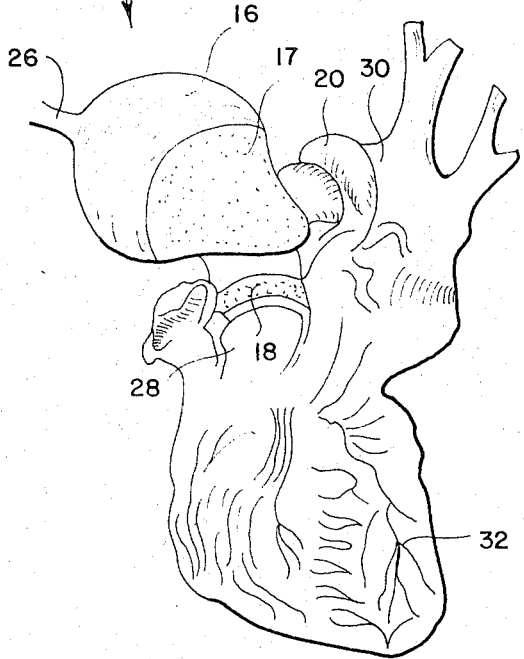
FIG. 4 is a perspective view showing the device of FIG. 1 implanted in the ascending aorta.
Figure 5:
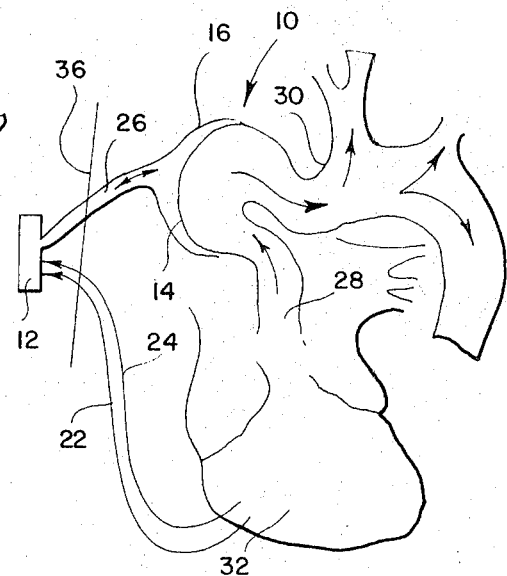
FIG. 5 is a schematic diagram showing the general shape and location, as well as the operation of the improved auxiliary ventrile.

Briefly, a heart pump system in accordance with the present invention includes in general an auxiliary ventricle 10 and an electronic external control unit 12. The auxiliary ventrile 10 comprises a flexible inflatable and collapsible bulb 14 of generally spherical shape within a firm or rigid complementary casing 16 having generally the same contour. The auxiliary ventricle 10 is provided with a pair of cuffs or arterial graft sections 18 and 20, which are to be sutured to the lower and upper portions of the ascending aorta, respectively, the artificial circuit thereby generally following the aortic arch. Two electrodes 22 and 24 pick up the ECG from the left ventricle and this triggers the external control unit 12 which, during diastole, then forces air through a tube 26 to the space between the rigid casing 16 and the flexible, preferably elastic, bulb 14 to thereby drive the auxiliary ventricle.

In more detail, the auxiliary ventricle 10, adapted to be implanted within a living body, is provided with a generally spherical or dome-like configuration having at its lower portion front and back generally flat downwardly tapering surfaces 17. A pair of tubular passageways 19 and 21 project from the lower curved bottom wall 23 of the casing 16 at an angle, in the illustrated embodiment, of about 30°. The cuffs 18 and 20, forming the terminal ends of the tubular passageways 19 and 21, respectively, of the auxiliary ventricle 10, are surgically

[1] See vols. IX, X and XI, Trans. Amer. Soc. Artif. Int. Organs (1963, 1964, 1965)—Also see "Hemodynamic Studies With a Newly Designed Auxilary Ventricle in Dogs," Trans. Amer. Soc. Int. Organs, 1967, vol. XIII.

sutured end-to-end, respectively, to the lower portion 28 of the ascending aorta, and the upper portion 30 of the ascending aorta. The electrodes 22 and 24, electrically connecting the heart 32 and the external control unit 12, as well as the compressed air tube 26, which connects the auxiliary ventricle to the external control unit 12, pass through the body wall 36 (including skin) of the patient.

Located within the casing 16 and approaching the domelike bulb 14, are passageway extensions 19' and 21' which define, in cross-section, a U-shaped inner baffle 15 which projects toward the center of the bulb 14. As best seen in FIG. 1, the passageway extensions 19' and 21' diverge in diameter toward the bulb 14, and curve so as to enter the bulb 14 generally parallel with one another. This baffle 15 forces the blood from passageway 19 to flow over its terminal end before passing into exit passageway 21. As can be seen from FIG. 1, the baffle 15 extends upwardly about one-third the total height of the casing 16.

The auixilary ventricle 10 may be formed from materials similar to those described in the above-noted publications. Thus, the cuffs 18 and 20 may be formed of the well known woven "Teflon" (polytetrafluoroethylene) type arterial graft sections which are conventionally employed for the repair and replacement of damaged blood vessels; or they may be formed of more desirable "Dacron" (polyethylene terephthalate) fabric. This fabric may be joined to the tubular passageways 19 and 21 in a known manner, i.e. the end portions of cuffs may be ironed smooth, perforated to facilitate impregnation, and embedded in the end portions of tubular passageways 19 and 21 during the molding thereof.

If desired, the bulb 14, as well as the tubular passageways 19 and 21 may be all reenforced with Dacron fabric or with glass fabric.

The bulb 14 must be formed of a flexible material having a high tensile strength which is biologically inert so as to inhibit clotting of the blood. Two satisfactory materials are "Silastic 372" (a heat vulcanizable silicone rubber having an elongation of about 300% and tensile strength of about 1000 p.s.i.; Dow Corning Corporation) and a mixture of polyurethane and graphite which has been treated with benzalkonium chloride and heparin. The tubular passageways 19 and 21, as well as their extensions 19' and 21', are preferably formed integrally with the bulb 14 of the same material, or, alternatively, these may be formed separately of a more rigid material and then joined to the bulb 14, such as during the formation of the latter. In any event, the inner surfaces of the passageways 19 and 21, as well as their extensions 19' and 21', should be formed of the same material as the bulb 14, such as by coating the interior thereof after assembly with a polyurethane-graphite mixture.

The material from which the casing 16 is formed is not critical and such casing may be formed of any suitable material, such as a fiber-glass reenforced plastic, although it is necessary that the plastic utilized be non-toxic. The rigid casing may be formed of metal powder reenforced plastic such as epoxy resin filled with aluminum, or it may be formed of other materials such as polymers of methylmethacrylate, or other inert plastics of high strength or inert metals such as titanium or stainless steel. The air tube 26, preferably formed of flexible silicone rubber or similar plastic (although it may be formed of polyethylene or the like), is integrally attached to the casing 16 during formation of the latter.

The configuration of the auixilary ventricle 10 is an important feature of the present invention. The relatively short limbs 19 and 21 of the auxiliary ventricle occupy less space in the chest, bring the unit closer to the heart, and lessen the danger of compressing the lung. There are surgical advantages in placement of the entire unit in the ascending aorta since it is more accessible. The time required for introducing the auxiliary ventricle 10 into the circulatory system is greatly shortened at no sacrifice to hemodynamic advantages. In experiments, implantation of the dome-shaped ventricle 10 required only about two minutes, as compared with approximately one hour for implantation of an earlier auixilary ventricle (see vol. XI, 1965, Trans. Amer. Soc. Artif. Int. Organs). As indicated above, the hemodynamic advantages are retained and, in fact, enhanced by permitting the blood to flow in its normal physiologic route.

Operation of the device will be obvious to those having normal skill in the art. Briefly, however, it will be clear that the flexible and inflatable bulb 14 will fill with blood during systole of the natural heart. As it fills, the air between the bulb 14 and the rigid casing 16 is forced out through the plastic tube 27. The left ventricle works less hard to pump its blood to the nearby auxiliary ventricle (against atmospheric pressure) than it would be a diseased, inelastic aorta and the remote blood vesssels (against normal arterial pressure). The ejected air from the tube 26 may be either vented to atmosphere or a slight vacuum may be applied thereto which will ease the work of the natural heart to an even greater degree.

Cardiac diastole begins immediately after the aortic valves have closed. During diastole, compressed air is introduced through the tube 26 to the space between the rigid casing 16 and the bulb 14. This causes collapse of the bulb 14 against the blood retained therein, thereby forcing the blood to either side of the baffle 15. Since the aortic valves are closed, the blood in the lower portion 28 of the ascending aorta and passageway 19 cannot be forced back into the heart, but the blood in the bulb 14 and in the passageway 21 is ejected into the peripheral vessels by way of the upper portion 30 of the ascending aorta and the descending aorta. The avalvular and spherical nature of the ventricle 10, containing the baffle 15, permits the easy and free flow of blood therethrough with minimal stagnation. The flow of blood through the device is at a high rate at all times and this is particularly helpful in reducing risk of clotting when the control unit 12 is not functioning and the auxiliary ventricle is merely acting as a passageway.

The surgical implantation procedure is extremely simple. The auxiliary ventricle 10 is rapidly implanted in the ascending aorta by means of a single incision. The unit is implanted in the ascending aorta during short-term inflow and outflow occlusion of the heart, the time required for the actual insertion and temporary ligation of the tube cuffs 18 and 20 being two minutes, after which the circulation is re-established and the anastomosis is completed.

Experiments on fourteen dogs using a device embodying certain of the principles of the present invention showed that the most favorable hemodynamic effects could be obtained when the auxiliary ventricle was implanted in the ascending aorta as close to the heart as possible. The reduction in tension-time index was found to reach 50% in some cases.

The following examples show two methods by which the auxiliary ventricle may be formed. However, it is to be understood that the specific features set forth in these examples are not to be considered limiting of the invention.

EXAMPLE I

A polyethylene mold for the inner bulb and the passageways is formed to the desired shape and is then coated with polyvinyl alcohol. When completely dry, the mold is layered with 0.030 inch of silicone rubber (e.g. "Silastic 372") reenforced with "Dacron" mesh fabric. Care is exercised to prevent irregularities at the juncture lines. (The mesh fabric reenforcement is optional.) The layered structure and the polyethylene mold are then autoclaved at 260° F. for thirty minutes, which melts out the polyethylene and vulcanizes the silicone rubber. The water soluble polyvinyl alcohol is then rinsed off, leaving a flexible "Silastic" bulb having the passageways depending therefrom. The bulb is then coated on both surfaces with a xylene solution of "Silastic" adhesive (medical adhesive 891, silicone type A, Dow Corp.) to provide a smooth surface on the bulb. At this point, the bulb 14, passageways 19 and 21, and the cuffs 18 and 20 are provided as an integral unit.

Two fiberglass reenforced plastic shells are then molded in suitable forms to provide shapes complementary to that of the bulb portion 14 of the previously formed structure. The epoxy resin is cured and holes are drilled in the hardened shells. The shells are then dipped in the above referred to "Silastic" and xylene solution. The outer surface of each shell is then covered with a layer of "Dacron" mesh reenforced "Silastic 372." The two shells are then placed around the flexible bulb 14 and polyethylene air tube 26 is inserted and affixed in place with the "Silastic" adhesive, which adhesive is also used to seal the edges of the two shells together. The entire unit is then covered with another layer of "Dacron" mesh reenforced "Silastic 372."

EXAMPLE II

A polyethylene mold, similar to that used in Example I, is coated on all surfaces with two layers of polyurethane dissolved in cyclohexanone and tetrahydrofuran, to which is added colloidal graphite. Dacron fabric is then wrapped around the terminal portions of the mold to form reenforcement of the cuffs 18 and 20. Next, two layers of pure polyurethane solution are coated over the entire mold, after which two more layers of polyurethane solution are applied to that portion of the mold corresponding to the passageways 19 and 20 and their extensions including portion 15. The polyethylene mold is then removed, as in Example I.

A stiff casing, formed of two aluminum powder-filled epoxy resin shells covered with "Dacron" mesh and having holes drilled therethrough, is dipped in a solution of pure polyurethane. The inner surface of the bulb and the passageways 19 and 21 are then coated with a colloidal graphite-xylene solution and are then oven-dried for 24 hours at 56° C. and soaked overnight in a 2% benzalkonium chloride solution and for one hour in a heparin-saline solution. The casing shells are then placed over the bulb and united to one another.

Figure 6:
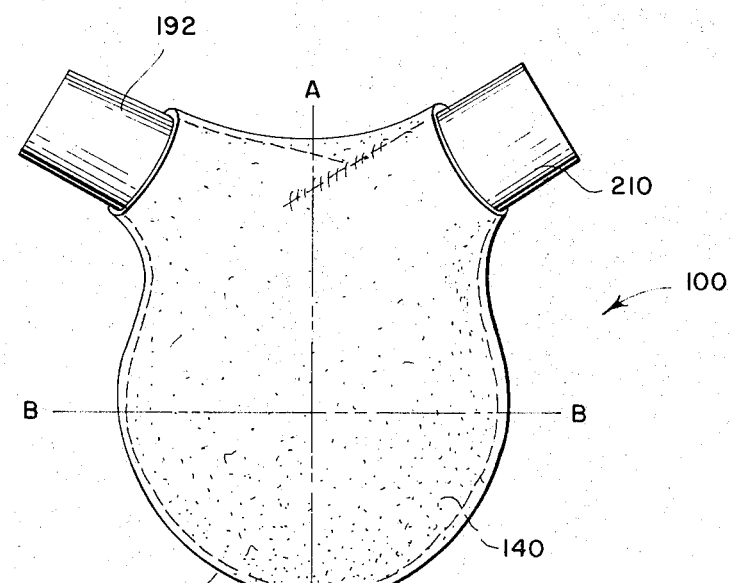
FIGS. 6 and 7 are front and side elevations, respectively, of an alternate embodiment of the present invention.
Figure 7:
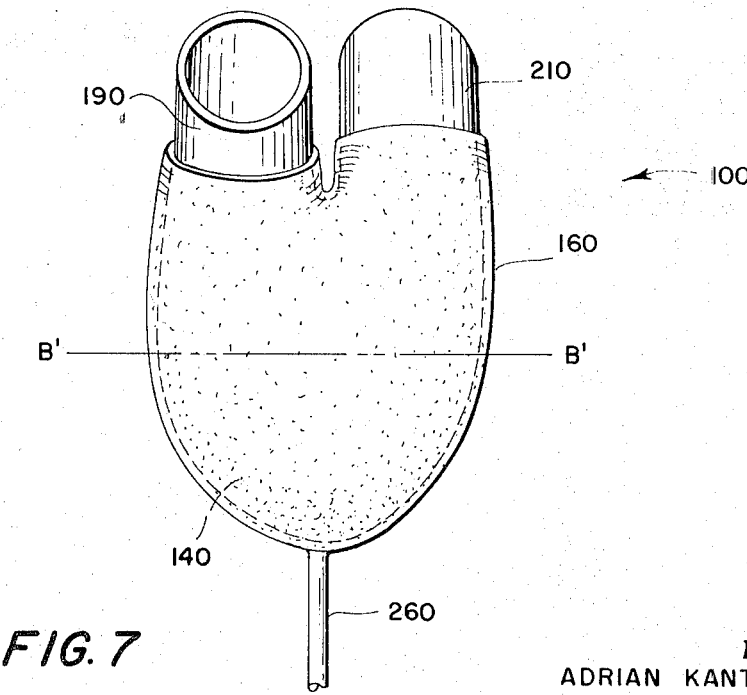

Another embodiment 100 of the invention is shown in FIGS. 6 and 7. In this embodiment, bladder 140 (shown in phantom) is generally circular in lateral cross section (along axis A—A) and generally elliptical in horizontal cross section (along axes B—B and B'—B'). At its lower surface it bifurcates into two passageways 190 and 210 that leave the bladder or bulb 140 at an angle of 30° from the horizontal plane. The passageways are generally parallel to each other on the long axis (see FIG. 6) and extend beyond each other into the bulb 140.

The flexible bladder 140 is constructed of "Dacron"-reinforced silicone rubber and is encased in an airtight epoxy-fiberglass shell 160. A "Dacron" arterial graft (not shown), for suturing to the aorta, is cemented to the end of each passageway with silicone adhesive. A flexible silicone rubber tube 260 is sutured and cemented over a hole drilled in the shell 160 to provide a passageway for gas to inflate and deflate the bladder.

This configuration of auxiliary ventricle has no inner baffle and creates a "spiral" or "helical" pattern of blood flow due to its spherical-elliptical shape and the attitude of the passageways. It is implanted in the ascending aorta during short-term inflow and outflow occlusion of the heart after which the circulation is reestablished and the anastomosis completed, or by direct end to side anastomosis without interrupting the circulation. The device 100 is driven by compressed gas from an outside tank via the tube 260 just like device 10 and is controlled by a solenoid valve which is triggered by either the R-wave from the ECG or the left ventricular pressure curve.

The spiral booster 100 reduces the risk of blood stagnation with its attendant clotting because of the dynamic action of the blood flowing therethrough.

The present invention has been found to provide a number of significant advantages. Thus, the auxiliary ventricle 10 can be implanted in the ascending aorta by means of a single incision. It can be inserted easily and rapidly in only two minutes. It has no valves so that blood from the left ventricle can pass through the unit freely, and the clotting problem is no greater than in any other artificial arterial graft. It can be driven either continuously or intermittently. It is permanently implanted. And better hemodynamic results are obtained reducing the risk of clotting.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents of the following claims.

What is claimed is:

1. In an eletcronically controlled artificial auxiliary ventricle comprising a rigid casing, a hollow flexible silicone-rubber bulb having generally the same contour as said casing disposed within said casing, means adapted to detect the ECG from the left ventricle, and means to apply air pressure between said casing and said bulb responsive to said ECG,
   the improvement wherein said casing and bulb are generally spherical with said casing having at its lower portion front and back generally flat downwardly tapering surfaces and a bottom wall therebetween and further comprising:
   a first hollow passageway of short length upstream and in liquid communication with said hollow bulb, said first passageway terminating in a first hollow cuff, said first cuff being adapted to be grafted to the lower portion of the ascending aorta; a second hollow passageway of short length downstream and in liquid communication with said hollow bulb, said second passageway terminating in a second hollow cuff, said second cuff being adapted to be grafted to the upper portion of the ascending aorta with said auxiliary ventricle replacing the intermediate portion of the ascending aorta and thereby lying close to the heart; said hollow passageways extending through said bottom wall and defining a U-shaped baffle therebetween whereby blood moving up said first hollow passageway into said bulb is forced around said baffle prior to moving into said second passageway.

2. A device in accordance with claim 1 wherein said passageways extend from said bottom wall of said casing in generally opposite directions at an angle to the horizontal axis of about 30°.

3. In an electronically controlled artificial auxiliary ventricle comprising a rigid casing, a hollow flexible silicone-rubber bulb having generally the same contour as said casing disposed within said casing, means adapted to detect the ECG from the left ventricle, and means to apply air pressure between said casing and said bulb responsive to said ECG,
   the improvement wherein said casing and bulb are circular in lateral cross-section and elliptical in horizontal cross-section, and further comprising:
   a first hollow passageway of short length upstream and in liquid communication with said hollow bulb, said first passageway terminating in a first hollow cuff, said first cuff being adapted to be grafted to the lower portion of the ascending aorta; a second hollow passageway of short length downstream and in liquid communication with said hollow bulb, said second passageway terminating in a second hollow cuff, said second cuff being adapted to be grafted to the upper portion of the ascending aorta with said auxiliary ventricle replacing the intermediate portion of the ascending aorta and thereby lying close to the heart;

said passageways being generally parallel to each other along the long axis of said elliptical cross-section, and extending beyond each other into said bulb whereby blood moving up said first hollow passageway into said bulb moves about the interior of said bulb in a spiral pattern prior to moving into said second passageway.

References Cited

"Successful Hemodynamic Results With a New, U-Shaped Auxiliary Ventricle," by F. Gradel et al., Transactions Amer. Society for Artificial Internal Organs, vol. XI, pp. 277–283, June 19, 1965.

"Hemodynamic Studies With a Newly Designed Auxiliary Ventricle in Dogs," by Steinar Tjonneland et al., Transactions Amer. Society for Artificial Internal Organs, vol. XIII, pp. 306–310.

RICHARD A. GAUDET, Primary Examiner

R. L. FRINKS, Assistant Examiner